B. V. HARVEY & B. K. WATKINS.
HAND TRUCK.
APPLICATION FILED MAR. 6, 1915.
1,155,235.
Patented Sept. 28, 1915.
2 SHEETS—SHEET 1.
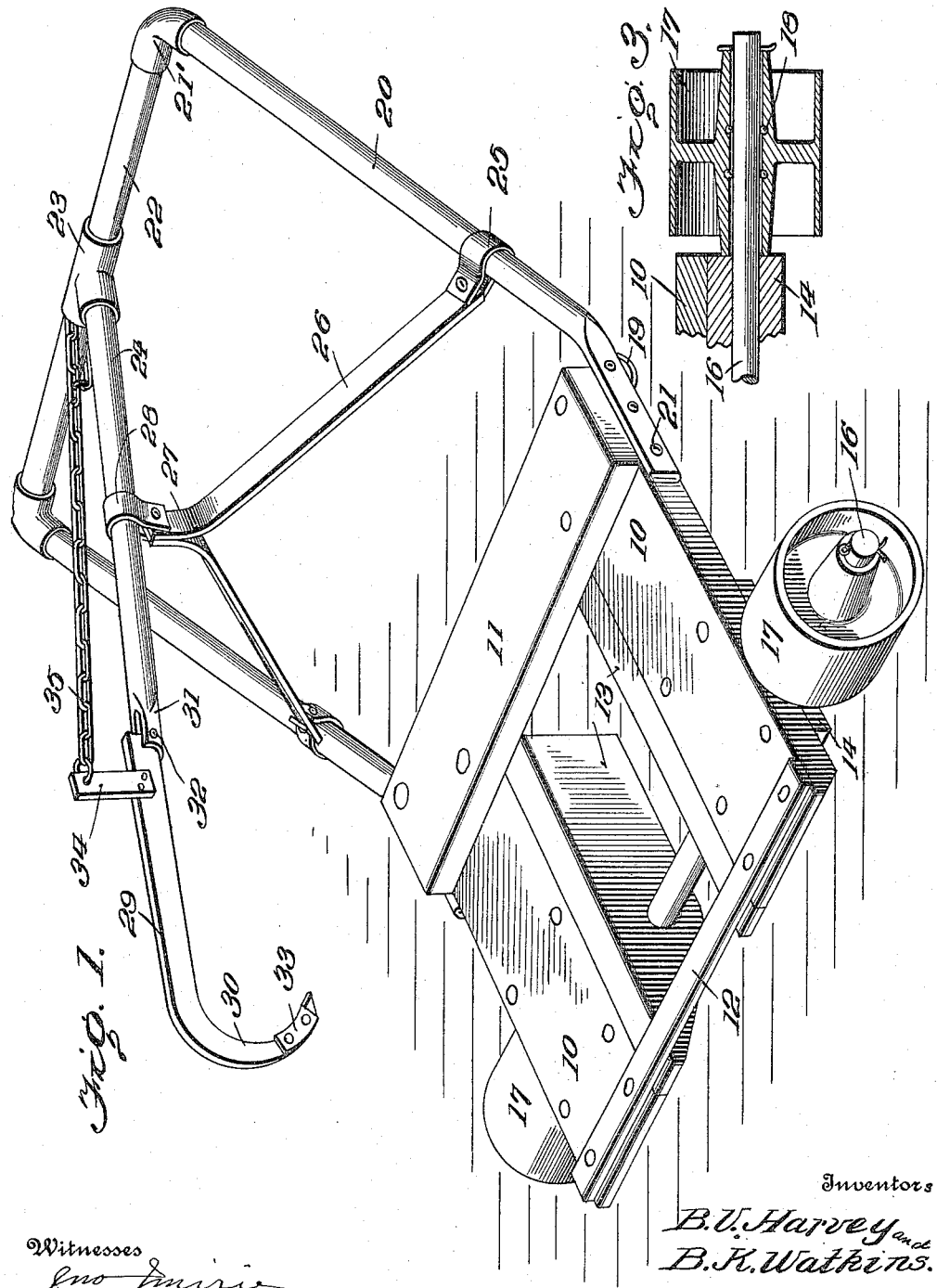

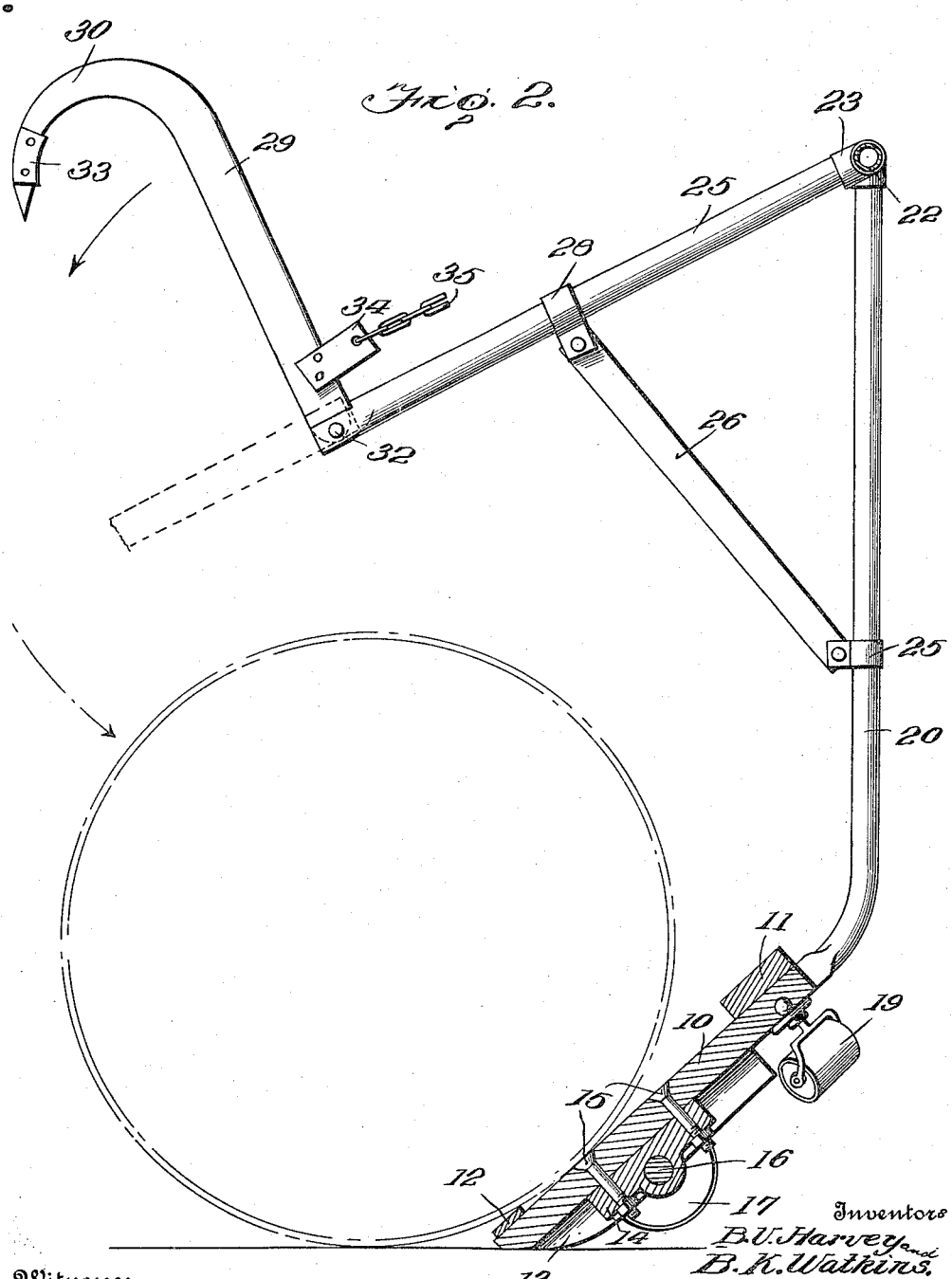

UNITED STATES PATENT OFFICE.

BENJAMIN V. HARVEY AND BASIL K. WATKINS, OF DANVILLE, VIRGINIA.

HAND-TRUCK.

1,155,235.  Specification of Letters Patent.  Patented Sept. 28, 1915.

Application filed March 6, 1915. Serial No. 12,580.

*To all whom it may concern:*

Be it known that we, BENJAMIN V. HARVEY and BASIL K. WATKINS, citizens of the United States, residing at Danville, in the county of Pittsylvania and State of Virginia, have invented certain new and useful Improvements in Hand-Trucks, of which the following is a specification.

This invention contemplates an improved truck especially adapted for use in handling barrels or hogsheads and has as its primary object to provide a device of this character so constructed that a barrel or hogshead may be readily and easily loaded upon the truck and transported from place to place.

The invention has as a further object and more specifically, to provide a truck having a barrel or hogshead engaging member mounted thereon and arranged to coact with the platform of the truck, so that in use, the truck may be tilted with the platform thereof disposed against one side of the barrel or hogshead and said member moved into engagement therewith in such manner that the subsequent movement of the truck to normal position will, through the medium of said member, dispose the barrel or hogshead upon the platform. And the invention has as a still further object to provide a device of this character which will be of simple construction and which will prove durable and efficient in use.

Other and incidental objects will appear as the description proceeds and in the drawings wherein we have illustrated the preferred embodiment of our invention and wherein similar reference characters designate corresponding parts throughout the several views, Figure 1 is a perspective view of our improved truck showing the barrel or hogshead engaging member disposed in normal position, Fig. 2 is a side elevation with the platform of the truck shown in section, this view particularly illustrating the manner in which the truck is manipulated in loading a barrel or hogshead thereon, and Fig. 3 is a fragmentary sectional view of one of the wheels of the truck.

Coming now to more particularly describe the invention, our improved truck includes a platform having spaced parallel side members 10 preferably formed of wood, although any other suitable material may be employed. Connecting the side members 10 at the inner extremities thereof is a transversely extending cross-piece 11, while a transversely extending brace bar 12 is secured to the said side members adjacent the outer extremities thereof in any suitable manner.

Connected to the inner confronting edges of the side members 10 are longitudinally extending runners 13 which project laterally beneath the platform and which at their forward extremities are preferably curved as best shown in Fig. 2 of the drawings and merge into the forward edges of the respective side members 10. It will, of course, be understood that the specific configuration and dimensions of the platform may be varied as exigency may demand.

Mounted upon the under side of the platform are brackets 14 which are preferably detachably connected to the side members 10 by a plurality of bolts 15. The brackets 14 receive an axle 16 upon the extremities of which are mounted supporting wheels 17. As best shown in Figs. 1 and 3 of the drawings, the supporting wheels 17 are formed with relatively wide treads and are preferably provided with roller bearings 18.

Swiveled upon the side members 10 adjacent the inner extremities thereof are caster wheels 19 which, as best shown in Fig. 2 of the drawings are also preferably provided with relatively wide treads. As will be readily understood, the wheels 19 are adapted to coact with the supporting wheels 17 in supporting a load.

Connected to the inner extremity of the platform of the truck is a substantially U-shaped handle, the arms 20 of which are terminally connected in any suitable manner, to the outer edges of the side members 10 at the inner extremities of the said members. Preferably, the handle is of tubular form and it will be observed upon reference to Fig. 1 of the drawings that the arms 20 are flattened at their inner extremities to seat against the said side members and are preferably connected therewith by bolts 21.

The arms 20 are offset adjacent the flattened portions thereof to extend laterally and rearwardly of the platform of the truck and adjacent the outer extremities thereof are externally screw threaded to receive elbows 21' in which are respectively threaded one extremity of a cross bar section 22. Connecting the adjacent extremities of said sections is a T-joint 23, the said joint having screw threaded engagement with the sections.

Connected at its inner extremity with the joint 23 and having screw threaded engagement therewith, is a preferably tubular arm 24, the said arm being arranged in a plane substantially midway between the arms 20 of the handle and extending forwardly over the platform of the truck in spaced relation thereto, as best shown in Fig. 2 of the drawings. Mounted upon the arms 20 of the handle adjacent the inner extremities thereof, are clips 25 to which are connected brace bars 26, the said bars converging between the arms 20 and having their inner terminals 27 bent laterally and seating against each other. Connected to the terminals 27 of the brace bars and embracing the arm 24 at a point substantially midway its ends, is a clip 28. It will be observed that the arm 24 will be rigidly supported in position upon the handle of the truck.

Pivotally mounted at one extremity upon the outer extremity of the arm 24, is a work engaging member 29 substantially in the nature of a hook having the bill 30 thereof presented toward the platform of the truck. The outer terminal of the arm 24 is slotted as shown at 31 and freely receives the adjacent terminal of the shank of the hook which is connected with the arm by a suitable pivot pin 32.

It will be noted that the member 29 is pivotally connected to the arm at a point spaced from the outer end thereof, so that, as shown in Fig. 1 of the drawings, the arm will engage the said member for limiting it in its pivotal movement upon the arm toward the platform.

Mounted upon one side of the bill 30 of the hook, adjacent the free extremity thereof, is a stop lug 33 and preferably, the adjacent end of the hook is sharpened or pointed as illustrated in the drawings. The hook or work engaging member 29 is adapted to engage a barrel or hogshead as shall be presently described, and the stop lug 33 is provided for limiting the pointed extremity of the hook in its engagement with the barrel or hogshead, in a manner such as will be readily understood.

Mounted upon the shank of the hook or work engaging member 29 adjacent the inner extremity thereof is a laterally projecting upstanding arm or lever 34 which is preferably slightly inclined forwardly, toward the bill of the hook, as best shown in Fig. 1 of the drawings. The outer extremity of the lever 34 is provided with an opening which freely receives the terminal link of a chain 35, or other suitable flexible element, the opposite extremity of which is connected in any suitable manner to the bight portion of the handle of the truck.

As best shown in Fig. 1 of the drawings, the work engaging member 29 is mounted for pivotal movement either toward or away from the platform of the truck and in the normal position of the said member, as shown in Fig. 1, the chain 35 will be drawn taut to thus assist in supporting the member in such position. It will be observed that a person operating our improved truck may, through the medium of the chain 35, readily swing the work engaging member to inoperative position as shown in Fig. 2 of the drawings, by pulling upon the said chain.

In use, the truck is rolled to a position adjacent one side of the barrel or hogshead conventionally shown in Fig. 2 of the drawings and the truck is then tilted to dispose the platform to position resting against the adjacent side of the barrel or hogshead, as therein illustrated. In this connection, it is to be observed that the forward edges of the runners 13 are adapted to contact with the ground or other supporting surface and are thus adapted to reinforce and rigidly support the side members 10 at their forward extremities.

In tilting the truck, the work engaging member is moved upwardly upon its pivot, through the medium of the chain 35, away from the hogshead or barrel so as to permit the said hogshead or barrel to enter between the said member and the platform and after previously positioning the platform, the chain 35 is released, when the member 29 will, by gravity, move to engage the barrel or hogshead upon its side opposite the platform. As will be seen, by then pressing downwardly upon the handle of the truck to cause the truck to pivot upon the forward extremities of the platform, the work engaging member 29 will move the barrel or hogshead onto the platform.

It will thus be seen that the services of but a single person will be required in order to load a barrel or hogshead upon the truck which operation may be accomplished with ease and facility. It will further be seen that we provide a very simple construction for the purpose set forth and such as will prove entirely efficient in use.

Having thus described our invention, what we claim and desire to secure by Letters Patent is:—

1. A device of the character described including a platform, supporting wheels therefor, a handle carried by the platform, an arm mounted upon the handle and projecting over the platform in spaced relation thereto, and a work engaging member pivotally mounted upon said arm and adapted to coact with the platform, the work engaging member being adapted to engage the arm for limiting the said member in its pivotal movement toward the platform.

2. A device of the character described including a platform, supporting wheels therefor, a handle having spaced arms terminally connected to the platform, an arm connected to the outer extremity of the handle and extending over the platform in spaced relation thereto, brace bars extending between the arms of the handle and said last mentioned arm, and a work engaging member pivotally connected to the outer extremity of said last mentioned arm and adapted to coact with the platform.

3. A device of the character described including a platform, supporting wheels therefor, a substantially U-shaped handle having its arms connected to the platform, an arm connected to the bight portion of the handle and extending over the platform in spaced relation thereto, brace bars extending between the arms of the handle and said last mentioned arm, a work engaging member pivotally mounted upon said last mentioned arm and adapted to coact with the platform, and a flexible element connected to said member for actuating the member.

4. A device of the character described including a platform, supporting wheels therefor, a handle carried by the platform, a shiftably mounted work engaging hook operatively supported by the handle and limited in its movement in one direction with the shank of the hook disposed in substantially parallel relation to the platform, said hook being adapted to coact with the platform, an actuating lever carried by the hook, and a flexible element extending between said lever and the handle.

5. A device of the character described including a platform, supporting wheels therefor, a handle carried by the platform, an arm supported by the handle and extending over the platform in spaced relation thereto, a work engaging hook pivotally mounted upon the outer extremity of the arm and adapted to coact with the platform, the hook being adapted to engage the arm for limiting the hook in its movement toward the platform, an actuating lever carried by said hook, and a flexible element connected to the free extremity of said lever, whereby the hook may be moved upon its pivot through the medium of said element.

6. A device of the character described including a platform having spaced side members, a cross piece connecting said side members at their inner extremities, a cross bar connecting said members at their outer extremities, longitudinally extending runners mounted upon the confronting edges of said side members and projecting beneath the platform, the forward edges of said runners being curved and merging respectively into the forward edges of said side members, said runners at their forward extremities being adapted to coact with the forward extremities of the side members in supporting a load, brackets mounted upon the side members, an axle carried by said brackets, supporting wheels mounted upon said axle, a substantially U-shaped handle having its arms terminally connected to opposite sides of the platform at the inner extremity thereof, an arm terminally connected to the bight portion of the handle and extending over the platform in spaced relation thereto, brace bars mounted upon the arms of the handle and connected to said last mentioned arm, a work engaging hook pivotally connected at its inner extremity to the free extremity of said last mentioned arm, the bill of said hook being normally presented toward the platform and adapted to coact therewith in engaging the work, an operating lever mounted upon the said hook, and a flexible element connected to said lever whereby the said hook may be actuated through the medium of said element.

In testimony whereof we affix our signatures in presence of two witnesses.

BENJAMIN V. HARVEY. [L. S.]
BASIL K. WATKINS. [L. S.]

Witnesses:
J. N. BENTON,
T. C. GUERRANT.

Copies of this patent may be obtained for five cents each, by addressing the "Commissioner of Patents, Washington, D. C."